United States Patent
Ishibashi et al.

[11] Patent Number: 6,134,197
[45] Date of Patent: Oct. 17, 2000

[54] OPTICAL DISK DRIVE APPARATUS

[75] Inventors: Hiromichi Ishibashi, Ibaraki; Takeharu Yamamoto, Takatsuki, both of Japan

[73] Assignee: Matsushita Electric Industrial Co., Ltd., Osaka, Japan

[21] Appl. No.: 09/058,886

[22] Filed: Apr. 13, 1998

[30] Foreign Application Priority Data

Apr. 14, 1997 [JP] Japan ................................. 9-095474

[51] Int. Cl.⁷ ............................................ G11B 7/00
[52] U.S. Cl. ................................. 369/44.32; 54/124.14
[58] Field of Search ........................... 369/44.23, 44.25, 369/44.26, 44.29, 44.32, 44.34, 44.35, 44.36, 44.41, 47, 48, 54, 124

[56] References Cited

U.S. PATENT DOCUMENTS

| 4,740,940 | 4/1988 | Tanaka et al. |
|---|---|---|
| 4,785,441 | 11/1988 | Tanaka et al. ..................... 369/44.23 |
| 5,671,200 | 9/1997 | Yamaguchi et al. |
| 5,859,816 | 1/1999 | Yamamoto ..................... 369/44.39 X |
| 5,986,999 | 11/1999 | Takahashi ..................... 369/44.41 X |

FOREIGN PATENT DOCUMENTS

| 5-80053 | 11/1993 | Japan. |
|---|---|---|
| 6-28697 | 2/1994 | Japan. |
| 8-55346 | 2/1996 | Japan. |
| 9-274771 | 10/1997 | Japan. |

OTHER PUBLICATIONS

English language abstract of JP 9–0274771.
English Language Abstract of JP6–28697.

*Primary Examiner*—Paul W. Huber
*Attorney, Agent, or Firm*—Greenblum & Bernstein, P.L.C.

[57] ABSTRACT

An optical disk drive apparatus drives an optical disk at a constant angular velocity (CAV). The optical disk is formatted under constant linear velocity (CLV). The phase error changes linearly from the inner most track to the outer most track. Tack pulse counter is provided to detect the radial position of the optical head on the optical disk. Calculators are provided to correct the phase error according to the radial position of the optical head.

5 Claims, 9 Drawing Sheets

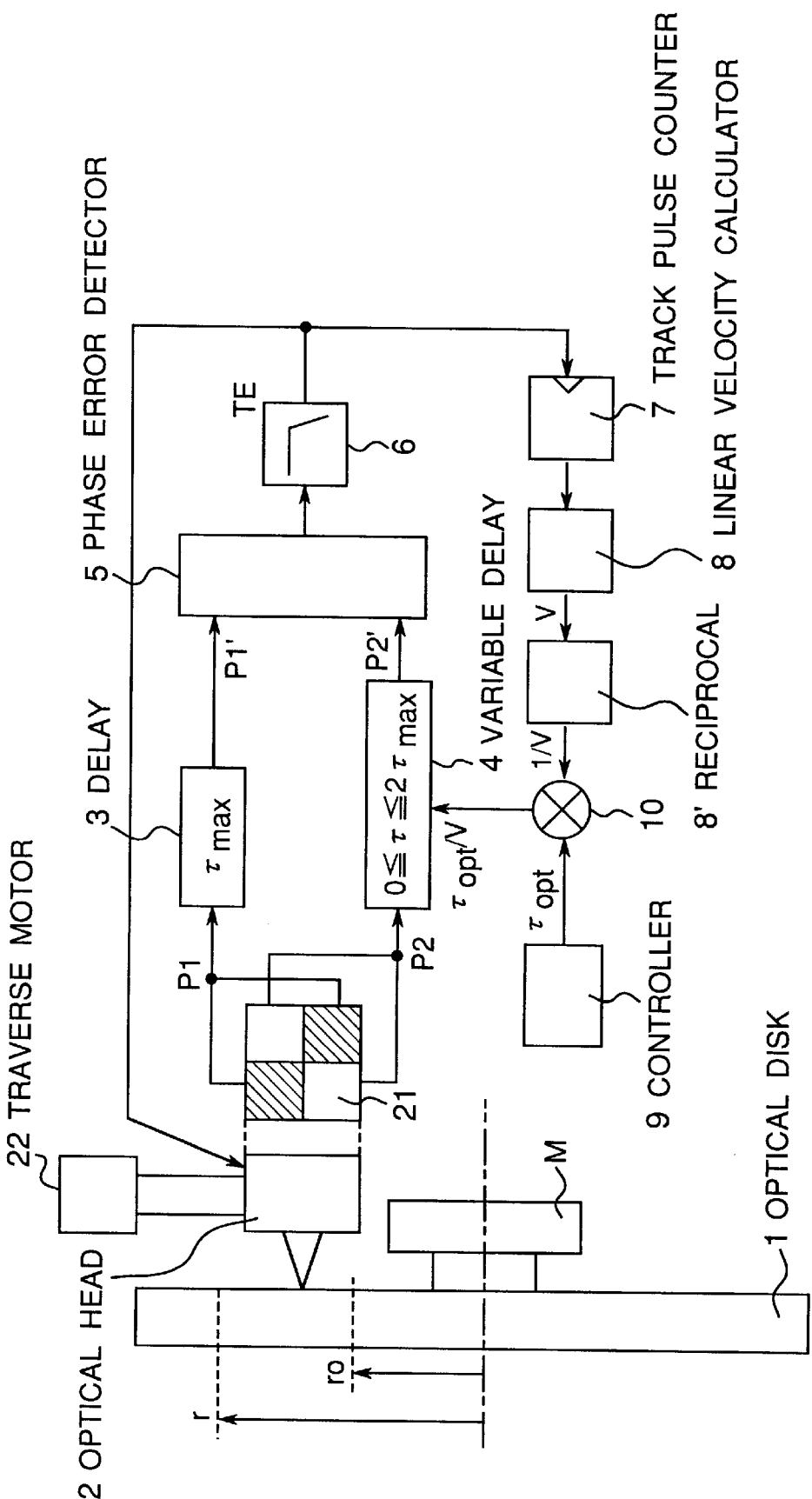

OPTICAL DISK DRIVE APPARATUS

BACKGROUND OF THE INVENTION

1. Field of the Invention

The present invention relates to tracking technology used in read-only optical disks such as CD-ROMs and/or DVDs etc., wave-form equalization technology for address recognition and data synchronizing technology.

2. Description of the Related Art

In recent years, the speed of optical disk drive apparatus has continued to increase. In this connection, important roles are played by tracking techniques for achieving high speed access and wave-form equalization for address reproduction.

A prior art optical disk drive apparatus is described below with reference to the drawings. FIG. 9 is a block diagram of a prior art optical disk drive apparatus. In FIG. 9, 101 is an optical disk constituted by a CD (compact disk) or DVS (digital video disk); this is mounted on a spindle motor. 102 is an optical head, which is provided with a laser light source and an orthogonally divided photosensor 121. A laser beam reflected by the optical disk information recording surface is directed on to the orthogonally divided photosensor, and electrical signals are output from the respective sensor elements. Of these output signals, signals from sensor elements that are located mutually opposite in the diagonal direction are added to each other and supplied to phase error detector 105. Positive and negative phase differences are generated in accordance with the direction and degree of the tracking error (offset of the focal point of the laser beam from the centre line during tracking) of these diagonally added signals. Viewing the outputs of these phase error detectors through filter 106, a tracking error signal TE whose polarity and amplitude changes in accordance with the tracking error is obtained. The tracking error signal is fed back to a tracking actuator of optical head 102 and tracking control is thereby performed (see for example Japanese Patent Publication No. H.5-80053).

However, with this system (differential phase tracking detection), tracking offset is easily generated due to the effect of aberration of the optical head and/or disk tilt from the optical head optic axis of the optical disk. Specifically, due to such spatial factors, phase offset is generated in the diagonal addition signals, and this appears as a spurious tracking error signal.

A delay element 103 and variable means for delay 104 are therefore employed. Means for delay 103 generates a time delay τ and variable means for delay 104 generates a time delay within a range of 0~2τ in accordance with a set value d that is supplied by a controller 109. A time difference is thereby generated that cancels the phase offset caused by the spatial factors, and it is believed that this offset or, in other words, tracking error component, can thereby be cancelled.

However, with the prior art, when the linear velocity of the optical disk recording information changes, the balance of the offset and compensation amount is lost, causing the problem that offset fluctuation is produced.

Specifically, the reason for this is that, whereas the phase distortion is generated by spatial factors such as the aberration of the optical system, the correction is implemented time-wise under the assumption that the wave form is generated with constant velocity. Essentially, even if the phase distortion is the same, if the linear velocity is high, tracking offset must be corrected with a small time error, while, if the linear velocity is small, correction must be effected with a large timing error.

This was scarcely a problem in the conventional case where CDs or DVDs were reproduced with predetermined linear velocity for audio or video applications, but in future the linear velocity will often be frequently changed when these are used in computer applications. An example that may be given is CAV (constant annular velocity) reproduction. The original CDs or DVDs were for reproducing music or video and were manufactured under the assumption that the information would be reproduced with constant linear velocity (CLV). Specifically, when such disks were cut, the master disk was rotated with fixed linear velocity and digital information was recorded with a fixed transfer rate. Consequently, when these were reproduced, the spindle motor was controlled so as to be driven with a fixed linear velocity irrespective of the speed of the inner or outer periphery of the disk, by varying the speed of rotation of the spindle motor at the inner or outer periphery of the disk. However, when these are employed as so-called CD-ROMs or DVD-ROMs for data files of computers, since random access is performed over both the inner and outer peripheries of the disk, attempting to reproduce the information with fixed linear velocity results in the spindle motor being repeatedly frequently accelerated and decelerated. As a result, it is difficult to raise the access speed of the data and furthermore power is consumed every time acceleration/deceleration is carried out.

Recently therefore, CD-CAV reproduction or DVD-CAV reproduction has been proposed in which the information is reproduced with the spindle motor always being rotated at constant angular velocity. Of course the transfer rate of the information signal at the inner and outer peripheries of the disk is different, but this can be absorbed by buffer memory, so, from the point of view of information signal processing, scarcely any problems arise. It does however result in offset of the time axis compensation when the tracking compensation described above is performed.

Also, apart from the above tracking offset compensation, time-wise compensation in respect of spatial factors could be performed using for example a wave-form equalizing filter. Specifically, when reproducing information from a carrier on which information is recorded with high density, such as a DVD, accurate reproduction cannot be achieved unless a filter is employed in which the gain in the higher frequency band is raised in accordance with a predetermined cut-off frequency. However, in the case of CAV reproduction as described above, there is a relative offset between the cut-off frequencies at the inner and outer peripheries of the disk. This presents a problem in particular when reproducing an address immediately after a track jump. Specifically, the method has been considered for example of seeking the optimum value of the equalization filter cut-off frequency such as for example to minimise the error of the information reproduction signal, if a sufficient time margin is available, but this suffers from the problem that time is required for track access (time from the start of the track jump until the information region of the desired address is reached).

The same problem arises if a PLL (phase locked loop) is used to synchronize the clock to the reproduction signal that is read from the carrier. Specifically, while the object of a PLL is to suppress frequency fluctuation of the reproduced signal i.e. jitter, in the case of CAV reproduction, since the linear velocities are different respectively at the inner and outer periphery of the disk, the centre frequency of jitter changes in proportion thereto, giving rise to the problem that optimum gain of the PLL cannot be set.

SUMMARY OF THE INVENTION

In order to solve the above problems, a first aspect of the invention consists in an optical disk drive apparatus comprising: an optical head that directs a laser beam on to information pits formed in an optical disk, and that obtains information reproduction signals from the reflected light; phase error detection means that detects a tracking error signal from the mutual phase difference of a group of signals output from a photosensor consisting of a plurality of photosensor elements provided on this optical head; and means for traversing said optical head in the radial direction of said optical disk; further comprising: time difference adjuster that generate mutually arbitrary time differences between the signals of said group; means for calculating the position of said optical head from the number of tracks that are crossed when said optical head is traversed in the radial direction; and means for altering the time difference of said time difference adjuster in accordance with said calculated position.

Also a second aspect of the invention consists in an optical disk drive apparatus comprising: an optical head whereby a laser beam is directed on to information pits formed on an optical disk, and that obtains an information reproduction signal from this reflected light; and phase error detection means that detects a tracking error signal from the mutual phase differences of a group of signals output from a photosensor consisting of a plurality of photosensor elements provided on the optical head; further comprising: time difference adjuster that generates mutual arbitrary time difference within said group of signals; means for calculating the signal length of said information reproduction signals; means for detecting the maximum length in unit time and for outputting a value related to maximum time length; and means for altering the time difference of said time difference adjuster in accordance with the value related to time length of said maximum-length signal.

Also a third aspect of the invention consists in an optical disk drive apparatus comprising: an optical head that directs a laser beam on to information pits formed in an optical disk, and that obtains information reproduction signals including address information from the reflected light; and means for traversing said optical head in the radial direction of said optical disk; further comprising: equalization means that increase the gain in an arbitrary frequency band of said information reproduction signal in accordance with a set value; means for calculating the position of said optical head from the number of tracks that are crossed when said optical head is traversed in the radial direction; and means for altering the set value of said equalization means in accordance with said calculated position.

Also a fourth aspect of the invention consists in an optical disk drive apparatus comprising: an optical head that directs a laser beam on to information pits formed in an optical disk, and that obtains information reproduction signals including address information from the reflected light; further comprising: equalization means that increase the gain in an arbitrary frequency band of said information reproduction signal in accordance with a set value; means for measuring the signal length of said information reproduction signal; means for detecting the signal of maximum length in unit time and outputting a value related to this maximum length; and means for altering the set value of said equalization means in accordance with a value related to the time length of said signal of maximum length.

Also a fifth aspect of the invention consists in an optical disk drive apparatus wherein a laser beam is directed on to information pits formed in an optical disk, and comprising phase synchronization control means for generating a clock signal that is phase-synchronized with respect to the information reproduction signal obtained from this reflected light; further comprising: means for measuring the frequency of said clock signal; and means for setting the gain in respect of said phase synchronization means proportionally with said frequency.

Also a sixth aspect of the invention consists in an optical disk drive apparatus comprising: an optical disk having a series of information pits recorded and formed with fixed rotational linear velocity; means for rotating this with fixed angular velocity; an optical head that directs a laser beam on to said optical disk, and that obtains reproduction signals from the reflected light; and means for traversing said optical head in the radial direction of said optical disk; further comprising: means for compensating the deviation of said reproduction signal produced by spatial factors of said optical disk and optical head in time-based manner or frequency-based manner in accordance with a set value; and means for supplying a set value inversely proportional or proportional to radial position of said optical head to said means for compensating in time-based manner or frequency-based manner.

Also a seventh aspect of the invention consists in an optical disk drive apparatus comprising: an optical disk having a series of information pits recorded and formed with fixed rotational linear velocity; means for rotating this with fixed angular velocity; an optical head that directs a laser beam on to said optical disk, and that obtains reproduction signals from the reflected light; and means for traversing said optical head in the radial direction of said optical disk; further comprising: means for compensating the deviation of said reproduction signal produced by spatial factors of said optical disk and optical head in time-based manner or frequency-based manner in accordance with a set value; means for detecting the signal of maximum length in said reproduction signal in unit time and for outputting a value related to maximum time length; and means for supplying a set value depending on a value related to the time length of said signal of maximum length to said means for compensating in time-based manner or frequency-based manner.

BRIEF DESCRIPTION OF THE DRAWINGS

FIG. 1 is a block diagram of a first embodiment of an optical disk drive apparatus according to the present invention;

DESCRIPTION OF THE PREFERRED EMBODIMENTS

Figure 2A:
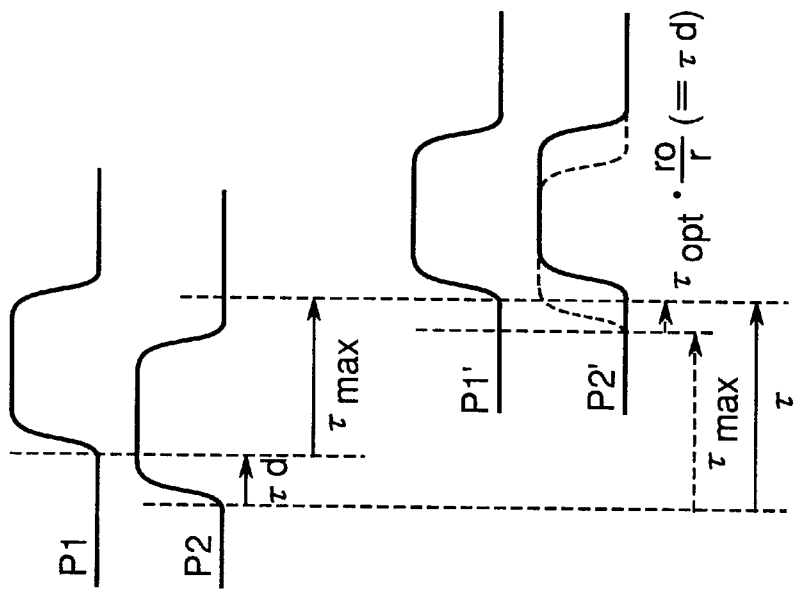
FIGS. 2A and 2B are timing charts of the operation of FIG. 1.

Embodiments of the present invention are described below with reference to the drawings. FIG. 1 is a block diagram of a first embodiment of the present invention. In FIG. 1, 1 is an optical disk consisting of a CD (compact disk) or DVD (digital video disk), on to which data is recorded using the CLV system. Consequently, the mark length of data is the same whether at the outermost peripheral track or at the inner limit peripheral track. An optical disk 1 is mounted on spindle motor M. 2 is an optical head, which comprises a laser light source and an orthogonally divided photosensor 21. Spindle motor M rotates with constant velocity, so that optical disk 1 is driven in rotation by the CAV system i.e. whatever the position of optical head 2, the speed of rotation is always fixed. The laser beam that is reflected by the information recording surface of the optical disk is directed onto the orthogonally divided photosensor and electrical signals are output from the respective photosensor elements. Of these output signals, signals from photosensor elements that are arranged mutually diagonally opposite to each other are added and a delay is applied thereto, after which the result is supplied to phase comparator 5. Let one of these signals to be diagonally added be P1 while the other signal to be diagonally added is P2. A phase difference of signal P2 to be diagonally added with respect to signal P1 to be diagonally added in the positive direction or negative direction is produced, depending on the direction and degree of the tracking error. Phase comparator 5 outputs a phase difference signal and, by being passed through filter 6, the phase difference signal is generated as a tracking error signal TE. Tracking error signal TE is a signal whose polarity and amplitude vary depending on the tracking error. Tracking control is implemented by feedback of the tracking error signal TE to a tracking actuator of optical head 2. The optical head can be freely traversed from the inner periphery of optical disk 1 to the outer periphery by means of a traverse motor 22.

3 is a delay means that generates a fixed time delay $\tau$ max and 4 is a variable delay means that generates a variable time delay $\tau$. Time delay $\tau$ can be varied in the range $0 \leq \tau \leq 2\tau max$. It is assumed that the signal to be subjected to diagonal addition and delayed by delay means 3 is P1', and that the signal to be subjected to diagonal addition and delayed by variable delay means 4 is P2'. Signal P2' to be subjected to diagonal addition is subjected to delay (advance) correction with respect to signal P1' to be subjected to diagonal addition within a range from $-\tau max$ to $\tau max$. This phase delay will be described in further detail below.

Figure 2B:
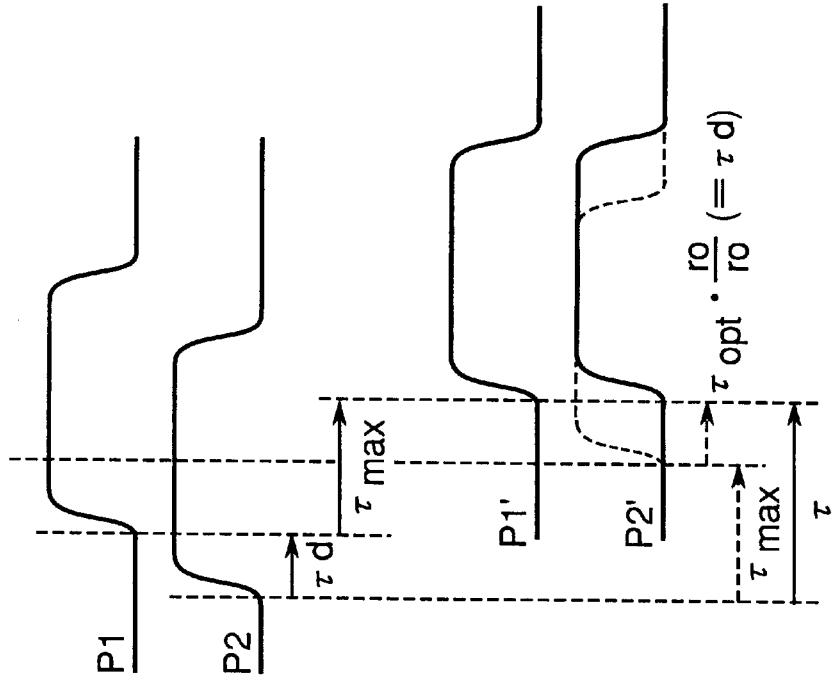

FIG. 2(a) indicates the position of r0 on optical disk 1 i.e. the signals P1, P2, P1', P2' at the inner limit peripheral track. FIG. 2(b) shows the position of r of optical disk 1 i.e. the signals P1, P2, P1', P2' on an arbitrary track. The signals shown in FIG. 2(a) and FIG. 2(b) are signals of the same content, but the signal of FIG. 2(a), which is the signal on the inner limit peripheral track, has a longer pulse width. This is because pits of the same mark length are reproduced by the CAV system.

As shown in FIG. 2(a), since signal P2 is advanced by a phase difference $\tau d$ with respect to signal P1, signal P2 must be delayed by a phase difference $\tau d$. In the present invention signal P1 is delayed by $\tau max$, and signal P2 is delayed by $\tau(=\tau max+\tau d)$. This has the same effect as delaying signal P2 by $\tau d$ with respect to signal P1. Another way of thinking of this is that both signal P1 and signal P2 are delayed by $\tau max$, and then only signal P2 is further delayed by $\tau d$.

It should be noted that, if the phase difference $\tau d$ at the inner limit peripheral track is taken as $\tau opt$, the phase difference $\tau d$ at any arbitrary track can be expressed by $\tau opt \times r0/r$. This expression corresponds to the case where an optical disk 1 that is recorded under the CLV system is reproduced by a reproduction apparatus using the CAV system.

Track pulse counter 7 calculates the tracking position of optical head 2 by accumulating the number of pulses of the tracking error signal. 8 is a linear velocity calculation means which calculates a value V corresponding to the linear velocity from the tracking position information of optical head 2, 8' is a calculator for calculating an reciprocal of V and outputs 1/V. 9 is a controller that supplies a delay reference value $\tau opt$ that compensates for the tracking offset. 10 is a multiplying means that multiplies the delay reference value $\tau opt$ by the reciprocal 1/V of the linear velocity coefficient and supplies a set-up value for the delay amount $\tau=\tau opt/V$ to variable delay means 4.

$\tau max$ is the assumed maximum delay amount. Specifically, in the case of CAV reproduction, this is the delay amount when tracking on the inner limit peripheral track (radius r=r0) of optical disk 1. Also, $\tau opt$ is the optimum compensation delay amount capable of cancelling the tracking offset at the inner limit periphery. As already described, since $\tau opt$ compensates the delay produced by optic axis aberration of the disk and optical head, it has different values depending on the setting or the reproduced disk.

An embodiment of the present invention will be further described. In the case where a disk carrier 1 that has been recorded under CLV is driven in rotation under a CAV system, the reproduction linear velocity is different at the inner and outer peripheries of the disk, in proportion to the radial position. Specifically, on a CLV-type disk carrier 1, signals of the same bit length will have the same mark length both on the inner limit peripheral track and on an arbitrarily selected outer peripheral track, but when this is read with a CAV-type reproducing apparatus, the width of the pulse signals corresponding to this marked length will be longer for the track at the inner limit periphery, becoming progressively shorter going towards the outer peripheral track. Consequently, even for marks formed with the same length on the optical disk, the pulse width of the reproduction signal becomes shorter going towards the outer periphery. Of course, the phase difference between signals to be subjected to diagonal addition that are generated by space factors such as optic axis aberration of the optical head and/or tilt of the disk is detected as a shorter delay (or advance) going towards the outer periphery (phase is defined as phase=time×linear velocity).

Consequently, in order to compensate beforehand the phase error of signals P1, P2 supplied to phase comparator 5, as shown in FIG. 2, the compensation amount must be altered in the relationship $\tau opt \times r0/r$ (where r0 is the radius of the inner limit peripheral track) at any arbitrary radial position r. In order to learn this radial position, in this embodiment, the number of tracks that are crossed when a track jump occurs is measured.

Specifically, the track pulse counter 7 counts the number of track error signals TE that are generated when optical head 2 is traversed, during its motion, and calculates the current radial position of optical head 2. Linear velocity calculating means 8 then uses this to calculate the reciprocal 1/V (=r0/r) of the linear velocity coefficient V.

In addition, multiplier 10 calculates an amount $$\tau=\tau opt \times 1/V=\tau opt \times r0/r$$

from this and the reference value $\tau opt$ supplied by controller 9, and supplies the result to variable delay means 4.

In this way a delay amount is set in variable delay means 4 that is essentially inversely proportional to the linear velocity. Thus, linear velocity dependence of the compensation that is effected on the time axis for errors produced by spatial factors is eliminated and, as a result, a tracking operation can be performed that is not subject to problems created by CAV reproduction.

It should be noted that, while, in this embodiment, the base point used for calculating the position of optical head 2 was taken as the inner limit periphery of the optical disk, it does not need to be the inner limit periphery, so long as the tracking radius can be specified. So long as the target track information can be read by traversing the optical head 2, the address of the track in question can of course be reproduced and the track radial position can thereby be accurately identified, so, when optical head 2 is next traversed, this track can be taken as the base point.

Also, although in this embodiment, it was stated that "the current radial position of optical head 2 is calculated by counting the number of tracks that are crossed", this does not necessarily imply that the reference value is successively updated by finding the linear speed V every time a single track is crossed. The reference value could be updated every time a plurality of tracks are crossed, or could be updated at fixed time intervals (for example 1 ms). If the traversing distance is short, it is believed that sufficient accuracy can be guaranteed by updating only once between the commencement of traversing and completion of traversing.

Also, although, in this embodiment, delay means 3 was fixed, a variable delay means could be employed that generates a delay that is reciprocal to that of variable delay means 4.

Also, although in this embodiment, no special description has been given concerning the specific value of the optimum reference value τopt, this may be thought of as a value for which the tracking error signal TE is symmetrical with respect to a reference potential, or a value obtained as a result of searching by trial and error such as to make the reproduction error 8 of the information reproduction signal of a minimum.

Figure 3:
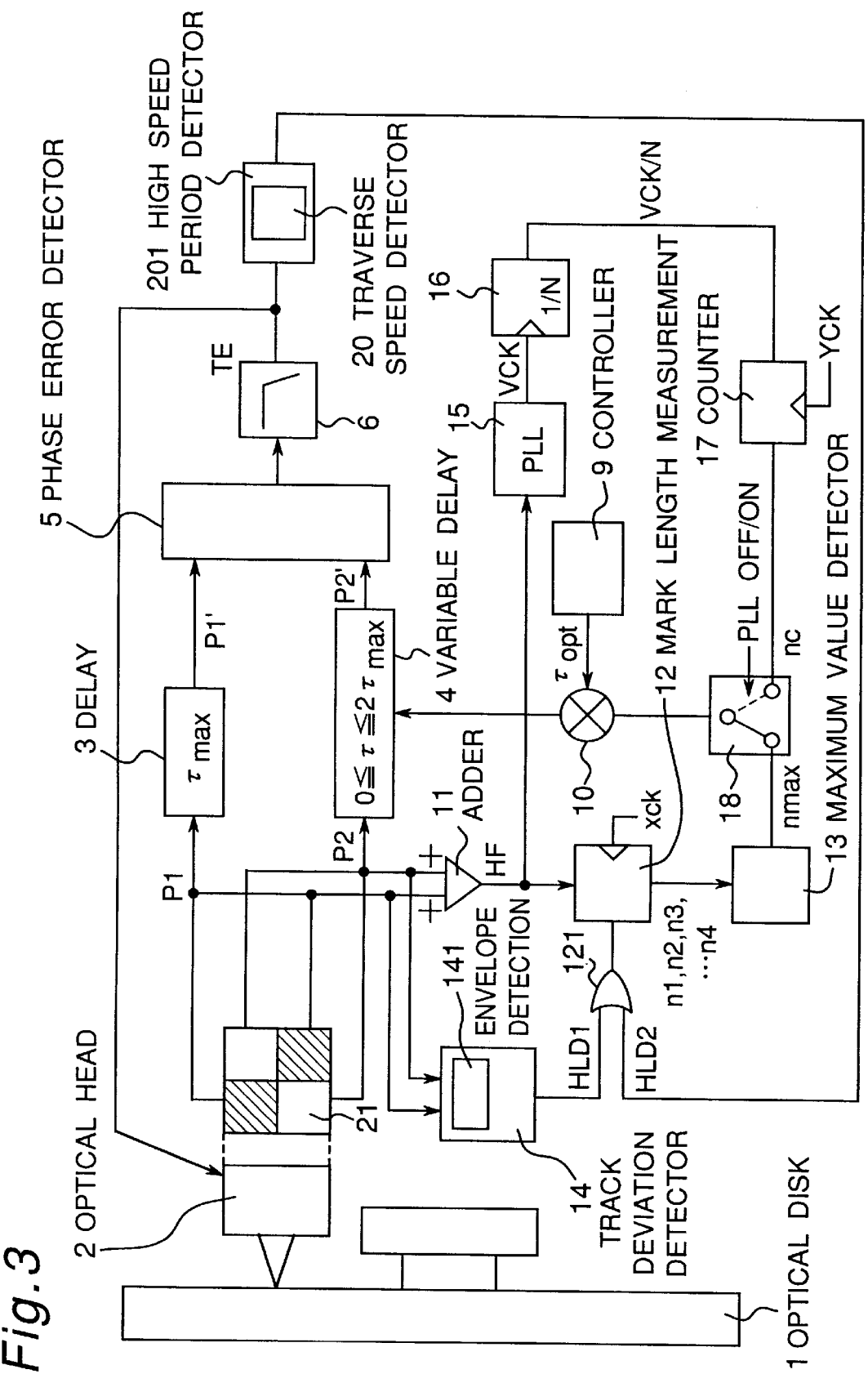
FIG. 3 is a block diagram of a second embodiment of an optical disk drive apparatus according to the present invention.

A second embodiment of the present invention is described below. This is characterised by detecting the linear velocity by measuring the pulse width of the mark of maximum length contained in the information reproduction signal. FIG. 3 is a block diagram of the second embodiment of the present invention. In FIG. 3, optical head carrier 1, optical head 2, orthogonally divided photosensor 21, delay means 3, variable delay means 4, phase comparator 5, filter 6, controller 9, and multiplication means 10 have the same function as those shown in FIG. 1 (first embodiment).

Furthermore, in this embodiment, 11 is an adder that is constituted by a read amplifier that obtains the overall added output of orthogonally divided photosensor 21 and generates an information reproduction signal HF corresponding to a mark. 12 is a mark length measuring means that measures the length of the pulses contained in information reproduction signal HF. 13 is a maximum length detection means that selects a maximum-length measured value in arbitrary unit time, of the aforesaid pulse lengths. 14 is a track deviation detection means that detects large deviation of the focal point position of particle head 2 from the information track and temporarily stops the operation of this mark length measuring means 12.

The operation of the second embodiment according to the present invention constructed as above will now be described. First of all, in the first embodiment, the number of tracks that were crossed during traversing of the optical head 2 were counted in order to ascertain the position of optical head 2. However, with this method, if track access failed, for example, if the tracking error signal TE became instantaneously undetectable due to for example offset of the focal point of optical head 2 during traversing, there was then no way of accurately knowing the position of optical head 2. Accurate position information can be obtained if the address can be detected from the information playback signal. However, in order to do this, it is necessary to execute track position control on an arbitrary track. The self-contradiction arises that, in order to execute stable track position servo control, an accurate offset must be applied, but, to achieve this, the position information of the optical head is necessary.

Figure 4:
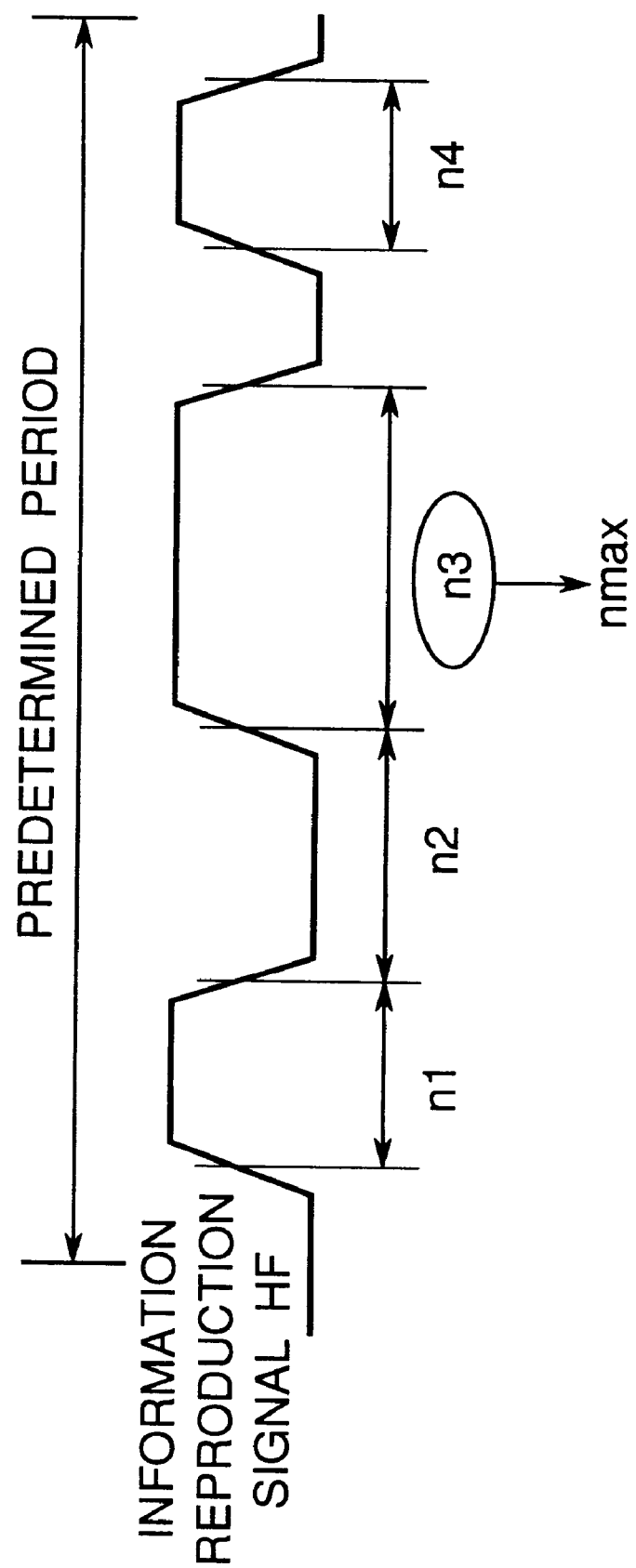
FIG. 4 is a timing chart of the operation of FIG. 3.

Accordingly, in this embodiment, even in the condition in which tracking is not performed, the linear velocity information is detected from the measured length of the signal of maximum mark length that is detected with high probability. To achieve this, suitably modulated information bit marks are formed on optical disk 1. In the case of CD format, taking the unit length as T, these consist of marks of length 3T to 11T, while, in the case of DVD, they consist of marks of length 3T to 14T. When these are reproduced, a read-out information signal HF consisting of pulses of different period at each mark length as shown in FIG. 4 is generated from read amplifier 11. Mark length measurement means 12 performs timewise sequential addition of the lengths of these pulses. Let us assume that their output sequence is n1, n2, . . . , n3. Specifically, the method may be considered of digital counting from edge to edge using a master clock XCK as in the present embodiment, or a method of converting the pulse time width to a voltage value using a charge pump. Maximum value detection means 13 selects the maximum value of the above output sequence n1, n2, . . . , n3, and outputs this as nmax.

As described above, in for example the case of a CD, the reproduction signal sequence includes signals having mark length of 3T to 11T with respect to unit length T (there are no marks of more than 11T). Consequently, if observation is continued for a sufficient period, it may be said that a signal for which the maximum value nmax which is obtained is a signal of mark length 11T will eventually be obtained. The actual value of nmax depends on the construction of the mark length measurement means 12, but let us assume that the maximum mark length nmax at the inner limit peripheral track is normalised as 1. If therefore the time length of the maximum mark length (in the case of a CD this is 11T) of an arbitrary track on optical disk 1 that is rotating at constant angular velocity is measured, the measured value will be shorter, the closer the track is to the outer periphery. For example, nmax =0.5 is measured at a radial position of twice the inner limit radius. This nmax that is then obtained is of course in the relationship of 1/V with respect to the linear velocity V. Consequently, if multiplication means 10 multiplies this nmax and the optimum reference value τopt supplied from controller 9 and supplies the result to variable delay means 4, optimum tracking offset compensation can be achieved irrespective of the linear velocity at the inner and outer peripheries of optical disk 1.

At this point, it should be noted that although (in the case of a CD) marks of more than 11T do not exist, blanks of more than this length may sometimes be detected. That is, when optical head 2 traverses across the tracks, it passes over mute areas between one track and another and these blanks may sometimes be erroneously detected as maximum marks. In order to avoid this, in this embodiment, a track deviation detection means 14 is provided, the operation of mark length detection means 12 being temporarily held by the hold signal HLD1 that is output from this. As specifically shown in FIG. 4, track deviation detection means 14 detects the total addition signal of orthogonally divided photosensor 21 i.e. the envelope of the information reproduction signal HF and, when this drops below a certain threshold, generates a hold signal. Also, although not specially shown in this embodiment, a hold signal could be generated when the absolute value of the phase difference between tracking error signals or diagonal addition signals, which are directly related thereto, exceeds a predetermined value. Such an arrangement is disclosed in the applicant's prior U.S. Patent application now patented as U.S. Pat. No. 5,671,200, which is incorporated herein by reference.

However, with the method of detecting this envelope, the fresh problem arises that, as the transfer velocity becomes large, as the signal frequency bandwidth is approached, it becomes difficult to differentiate between the signal and its envelope, so that a track deviation signal cannot be accurately detected. Accordingly, in this embodiment, in high-speed traversing also, just as in the case of track deviation, the operation of mark length measurement means 12 is temporarily held. Specifically, traverse velocity detection means 20 finds the traverse velocity V0 by measuring the frequency of the tracking error signal TE during traversing and, if this exceeds a certain threshold velocity, generates a hold signal HLD2 (FIG. 5), which, together with hold signal HLD1, is supplied through OR gate 121 to mark length measurement means 12.

Figure 5:
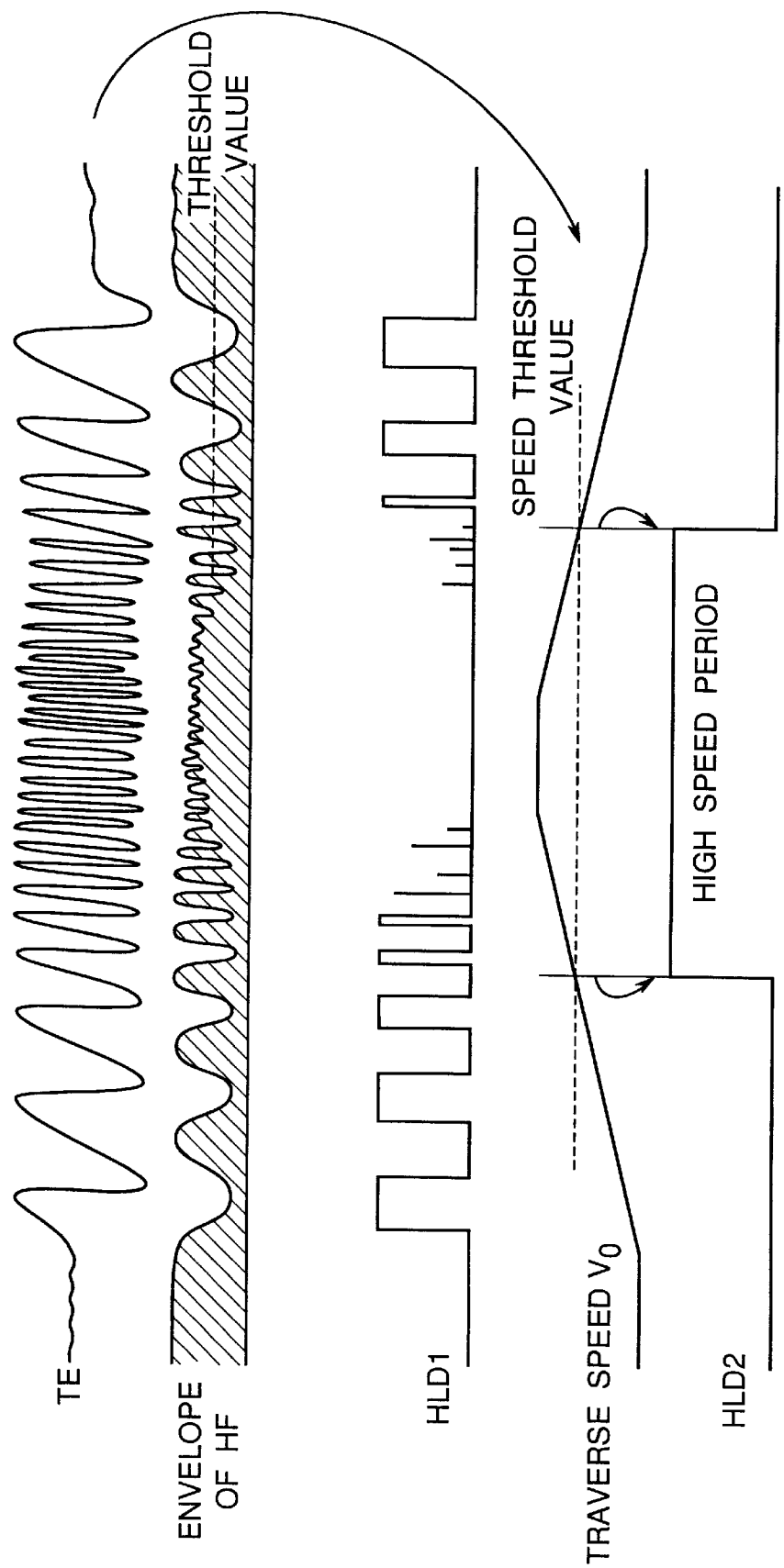
FIG. 5 is a timing chart of the operation of FIG. 3.

FIG. 5 is a waveform diagram at major sections in FIG. 3. Tracking error signal TE is the output of filter 6. The envelope of HF is the output of envelope detection means 141, which is within track deviation detection means 14 (the hatching indicates a collection of high frequency signals of small width). HLD1 is a binary signal generated using the envelope of HF as threshold value, and shows a HIGH level signal when the optical head 2 is in between the tracks. Traverse speed V0 is output from traverse speed detection means 20, and expresses the traverse speed of the optical head 2. HLD2 is a binary signal output from high speed period detector 201. High speed period detector 201 produces a HIGH level HLD2 when the traverse speed V0 of the optical head 2 is greater than a predetermined speed. The hold signals HLD1 and HLD2 are both applied to OR gate 121, and the output of which is applied to the mark length detection means 12. The mark length detection means 12 stops detection of the mark length when at least either HLD1 or HLD2 is in HIGH level.

In this embodiment, when a value relating to the linear velocity is measured by digitally counting the maximum-length mark signal, quantization error is inevitably produced. For example, if a clock XCK of about the channel clock frequency is employed as the counter clock, in the case of a CD, a measurement error of about 9% (=1/11) is produced. Accordingly, in this embodiment, there is further provided means for detecting linear velocity with further increased accuracy, only in the case where the PLL (phase locked loop) is operating.

In FIG. 3, PLL 15 comprises a phase error detector and a VCO (voltage controlled oscillator) and outputs a clock signal VCK synchronized with reproduction signal HF. The frequency of this clock signal is the channel clock itself i.e. expresses the transfer rate of the signal, so the linear velocity can be found by measuring its frequency (or period). Delay compensation corresponding to the linear velocity can be performed with high accuracy by supplying this measurement result nc instead of the output nmax of maximum value detection means 13 by changing over switch 18 when PLL is operating.

As described above, with this embodiment, the tracking offset can be corrected without being affected by changes of the linear velocity, by detecting the length of the maximum mark length of the information signal sequence recorded on the optical disk 1, and multiplying this with the offset reference value and, further, during PLL operation, multiplying the result obtained by counting the period obtained by frequency division of the PLL clock with this offset reference value. Also, spurious operation can be prevented by temporarily holding the operation of detecting the maximum mark during track deviation periods and during high-speed traversing.

Further, it should be noted that, although in the first and second embodiments, the subject of the compensation was taken as being the phase difference between diagonal addition signals, which act directly as tracking offset, there is no restriction to these embodiments, so long as an error generated by spatial factors is compensated by altering a time constant. That is, in cases where there is aberration at optical head 2, for example, relative phase differences would be expected to be generated at the four photosensor elements of orthogonally divided photosensor 21, so, by providing variable delay means for all the photosensor elements, the phase differences can be compensated with respective time constants.

Figure 6:
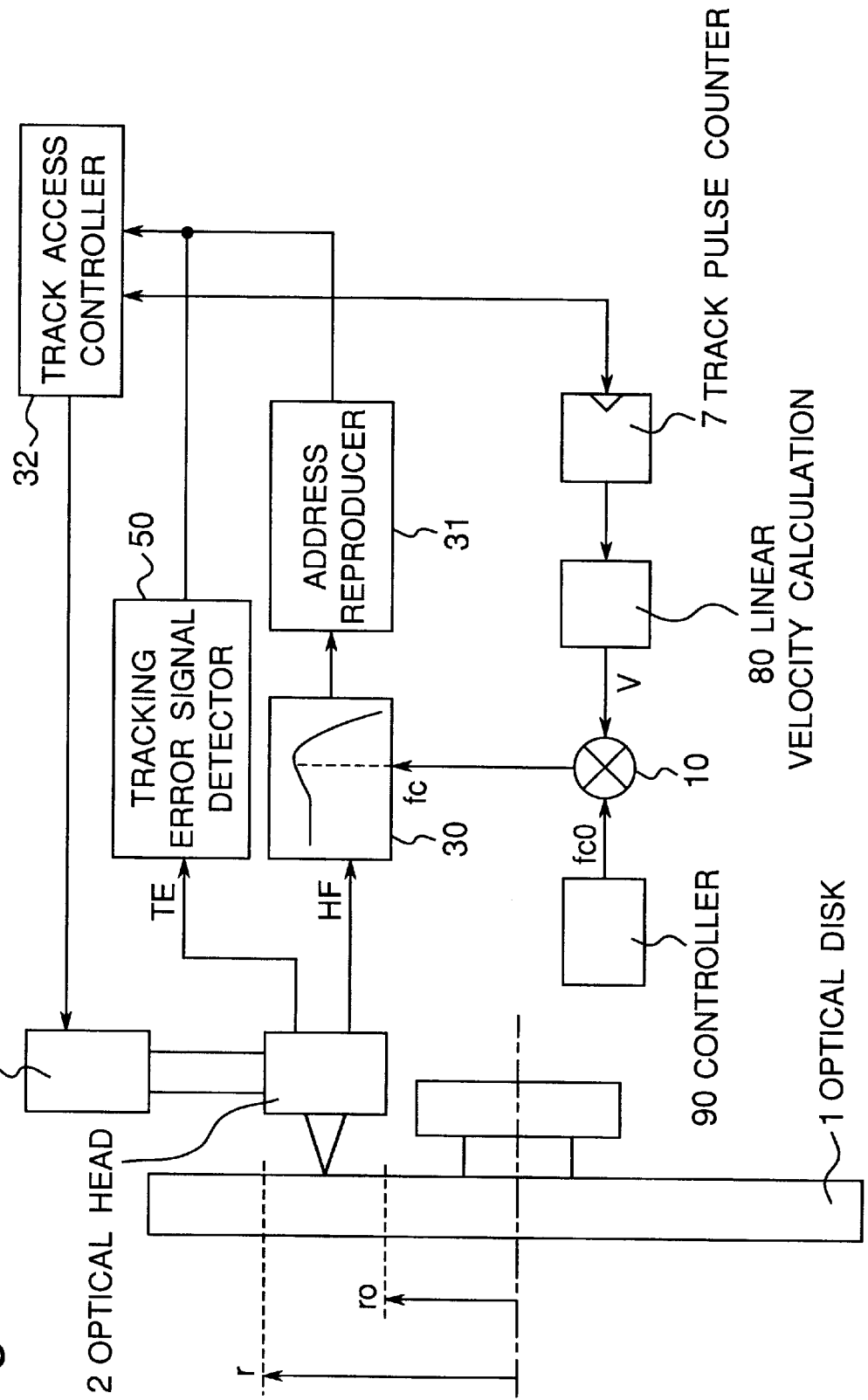
FIG. 6 is a block diagram of a third embodiment of an optical disk drive apparatus according to the present invention.

The gist of this is that the accuracy of track access is raised by accurate address reproduction from an optical disk that is rotating with constant angular velocity. FIG. 6 is a block diagram of this embodiment. In FIG. 6, optical disk 1, optical head 2, traversing motor 22, track pulse counter 7, and multiplying means 10 have the same functions as in the case shown in FIG. 1. However, in this embodiment, optical disk 1 is assumed to be a DVD (digital video disk). Also, in this embodiment, the tracking error signal TE is detected by tracking error detection means 50.

Reference number 30 is an equalizing filter. This has the function of passing with relatively high gain the information reproduction signal HF that is supplied from optical head 2, in the vicinity of a set cut-off frequency fc. 31 is an address recognition means that detects the address from this waveform-equalized information reproduction signal. 32 is a track-access controller, which has the function of operating traverse motor 22 in accordance with the track pulse output and the address signal. 80 is a linear velocity calculating means and 90 is a controller.

The operation of this embodiment constructed as above will now be described. A DVD (digital video disk) has a recording density about seven times that of a CD and appropriate waveform equalizing is necessary on information reproduction. Specifically, since recording is effected with a signal (3T signal etc.) that is recorded at high density i.e. with a signal of high spatial frequency of just about the limit of the spatial resolution of optical head 2, the reproduction amplitude is lowered by the space filtering effect. Since, on reproduction, such a signal is obtained as a high frequency band signal, the cut-off frequency fc of equalizing filter 30 is set practically at this frequency band and the drop in amplitude can be compensated by performing reproduction with relatively gain. However, such compensation also involves time-axis compensation of spatial factors associated with the optical disk 1 and/or optical head 2, so problems occur when a DVD is reproduced under CAV. For example, even if it is sought to make the cut-off frequency and high frequency band coincide at the inner limit periphery of the disk, since the signal frequency at the outer periphery is high, the gain in the relatively low band becomes high. Accordingly, in this embodiment, the arrangement is adopted of inferring the tracking position of the optical head 2 from the result of counting the track pulses, and, furthermore, the cut-off frequency fc is shifted to take into account linear velocity.

Linear velocity calculating means 80 finds the radial position (r) of optical head 2 from the address value immediately prior to track jump (traverse of optical head 2) and the number of track pulses obtained during traversing of the optical head, and calculates the linear velocity V proportional to this. Let us further assume that the linear velocity V at the inner limit periphery (r=r0) of optical disk 1 is normalised as 1. Also, if it is assumed that an optimum value fc0 of the cut-off frequency of equalizing filter 30 at the inner limit periphery is always supplied from controller 90, at an arbitrary track, a cut-off frequency fc represented by fc=V×fc0=r/r0×fc0 is supplied from multiplying means 10 to equalizing filter 30. As a result, even when optical disk 1 is being rotated with constant angular velocity, optimum equalization compensation can always be performed on the information reproduction signal, whether at the inner or the outer periphery of the disk.

Figure 7:
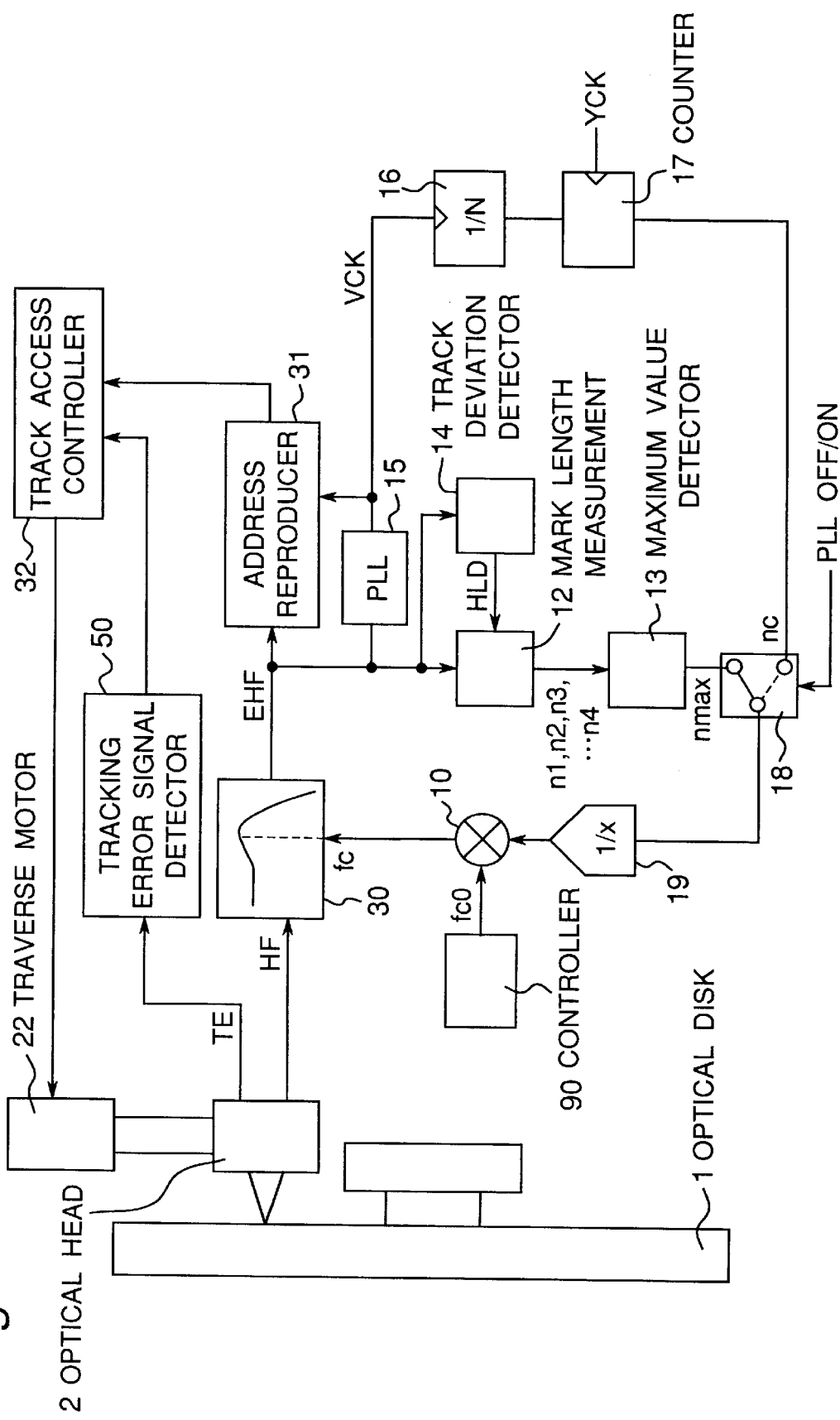
FIG. 7 is a block diagram of a fourth embodiment of an optical disk drive apparatus according to the present invention.

A fourth embodiment of the present invention is described below. This is characterised in that the linear velocity is detected by measuring the pulse length of the longest mark contained in the information reproduction signal. FIG. 7 is a block diagram of the fourth embodiment of the invention. In FIG. 7, optical disk 1, optical head 2, traverse motor 22, equalizing filter 30, address reproducing means 31, track access controller 32, controller 90, and multiplication means 10 have the same function as in the case of FIG. 6 (third embodiment).

Further, in this embodiment, 12 is a mark length measurement means that measures the length of the pulses contained in this information reproduction signal, and 13 is a maximum value detection means that selects the measured value of maximum length in an arbitrary measurement period of the lengths of these pulses. Also, 14 is a track deviation detection means that detects when the position of the focal point of optical head 2 deviates largely from the information track and thereupon temporarily holds operation of mark length measurement means 12. Also, in this embodiment, mark length measurement means 12 and maximum value detection means 13 are the same as shown in FIG. 3 (second embodiment), and have the functions already shown in FIG. 4.

The operation of the second embodiment according to the present invention constructed as above is described below. In the third embodiment, in order to ascertain the position of optical head 2, the number of tracks crossed by the optical head 2 during traverse is counted. However, with this method, if track access is lost, for example if tracking error signal TE temporarily becomes incapable of being detected due to deviation of the focal point of optical head 2 during the process of traversing, there is then no way to ascertain the correct position of optical head 2. The correct position information could be obtained if the address could be detected from the information reproduction signal, but, in order to do this, a suitable waveform equalization would have to be applied to the information reproduction signal. The self-contradiction arises that, in order to do this, a suitable cut-off frequency fc would have to be given and this would require position information of the optical head.

Accordingly, in this embodiment, even if the setting shows some degree of deviation, equalizing filter 30 detects the linear velocity from the measured length of the detected maximum length mark signal of highest probability. At this point, suitably modulated information bit mark lengths are formed on optical disk 1. In the case of the DVD format, marks are constituted of lengths from 3T to 14T. Mark length measurement means 12 measures the lengths of these pulses in a time-wise sequential fashion. Let this output sequence be n1, n2 . . . , n3. Specifically, the methods may be considered for example of digitally counting the edge to edge interval using the master clock XCK, or of converting the pulse time width to a voltage value using a charge pump. Maximum value detection means 13 selects the maximum value of this output sequence n1, n2 . . . , n3, and outputs this as nmax.

As described above, the reproduced signal sequence in for example the case of a DVD includes signals having mark lengths of 3T to 14T with respect to the unit length T (there are no marks of length more than 14T). Consequently, if observation is continued for a sufficient period, the signal of maximum value nmax that is obtained must inevitably be a signal of mark length 14T. The actual value of nmax depends on the construction of the mark length measurement means 12, but it may be assumed that the maximum mark length nmax at the inner limit peripheral track is normalised as 1. Accordingly, if the time length of the maximum mark length (14T in the case of a DVD) at any arbitrary track on optical disk 1 that is rotating with constant angular velocity is measured, it will be found that a shorter measured value is obtained the closer this track is to the outer periphery. For example, nmax =0.5 is measured at a radial position of twice the inner limit peripheral radius. The nmax that is then obtained is of course in the relationship 1 over linear velocity. Consequently, waveform equalization can be implemented wherein waveform deterioration produced by spatial resolution can be compensated irrespective of changes in the linear velocity at the inner and outer peripheries of optical disk 1, by taking the reciprocal of this nmax in reciprocal calculation means 19, then multiplying this by fc0 that is supplied from controller 90 by multiplication means 10, and supplying the result as cut-off frequency fc to equalizing filter 30.

However, since in this case, the value relating to the linear velocity is measured by digitally counting the signal produced by the maximum-length mark, quantization error is inevitably generated.

Accordingly, in this embodiment, there are further provided means for detecting the linear velocity with even higher precision in the case where a PLL (phase locked loop) is operated in generation of the synchronization clock for address reproduction. In FIG. 7, PLL 15 has the same function as that shown in FIG. 3 and outputs a clock signal VCK synchronized with the signal EHF after equalization. The frequency of this clock signal is identical with the channel clock i.e. it indicates the transfer rate of the signals, so the linear velocity can be found with high precision by measurement after subjecting the frequency (or period) of this to frequency division. By changing over switch 18 during PLL operation, the cut-off frequency of the equalizer can be-set with high precision by supplying this measurement result nc instead of the output nmax of maximum value detection means 13.

A point to which attention must be paid when detecting the maximum mark length (in the case of DVD) is that, although there are no marks of greater length than 14T, blanks of greater length than this may sometimes be detected. In other words, when optical head 2 moves across the tracks, it passes through mute areas between one track and another, so this blank may be erroneously detected as a maximum mark. In order to avoid this, in this embodiment, there is provided a track deviation detection means 14, the operation of mark length detection means 12 being temporarily held by a hold signal HLD that is output from this. Track deviation detection means 14 has the same function as that in FIG. 3.

As described above, with this embodiment, the length of the maximum mark length of the information signal sequence that is recorded on optical disk 1 is detected in terms of time and this and the offset reference value are multiplied, thereby making it possible to implement optimum waveform equalization irrespective of changes in linear velocity. As a result, an address can be accurately detected even immediately after a track jump.

It should be noted that, although, in this embodiment, the linear velocity was only calculated from the time length of the 14T mark, in the case of a DVD, the RESYNC mark could be employed. Specifically, in the case of the DVD format, the RESYNC mark is constituted by a pair of a 14T mark and a 4T mark. Consequently, after detecting the 14T mark in the maximum value detection, by adding the measured length of 4T, and taking this as a RESYNC mark of a total of 18T, a value corresponding to the linear velocity can be calculated from this total measured length. In this way, the detection resolution is improved and the accuracy of setting the cut-off frequency is raised.

A fifth embodiment of the present invention is described below. The gist of this embodiment is that the PLL phase control gain is optimised irrespective of the linear velocity. In the previous embodiments, phase error tracking and equalizer cut-off setting were given as examples of time axis compensation of error generated by spatial factors. However, a PLL whereby a clock signal is generated that is synchronized with the reproduction signal is a typical example of this. Specifically, the object of a PLL is to minimise the phase error (jitter) of the reproduction signal and the synchronization clock. In that this jitter is due to irregularity of length of the marks recorded on the optical disk, this is the same as the previous embodiments, being caused by an error that is generated by spatial factors. A PLL is therefore a means of compensating for this in a time-wise fashion.

Figure 8:
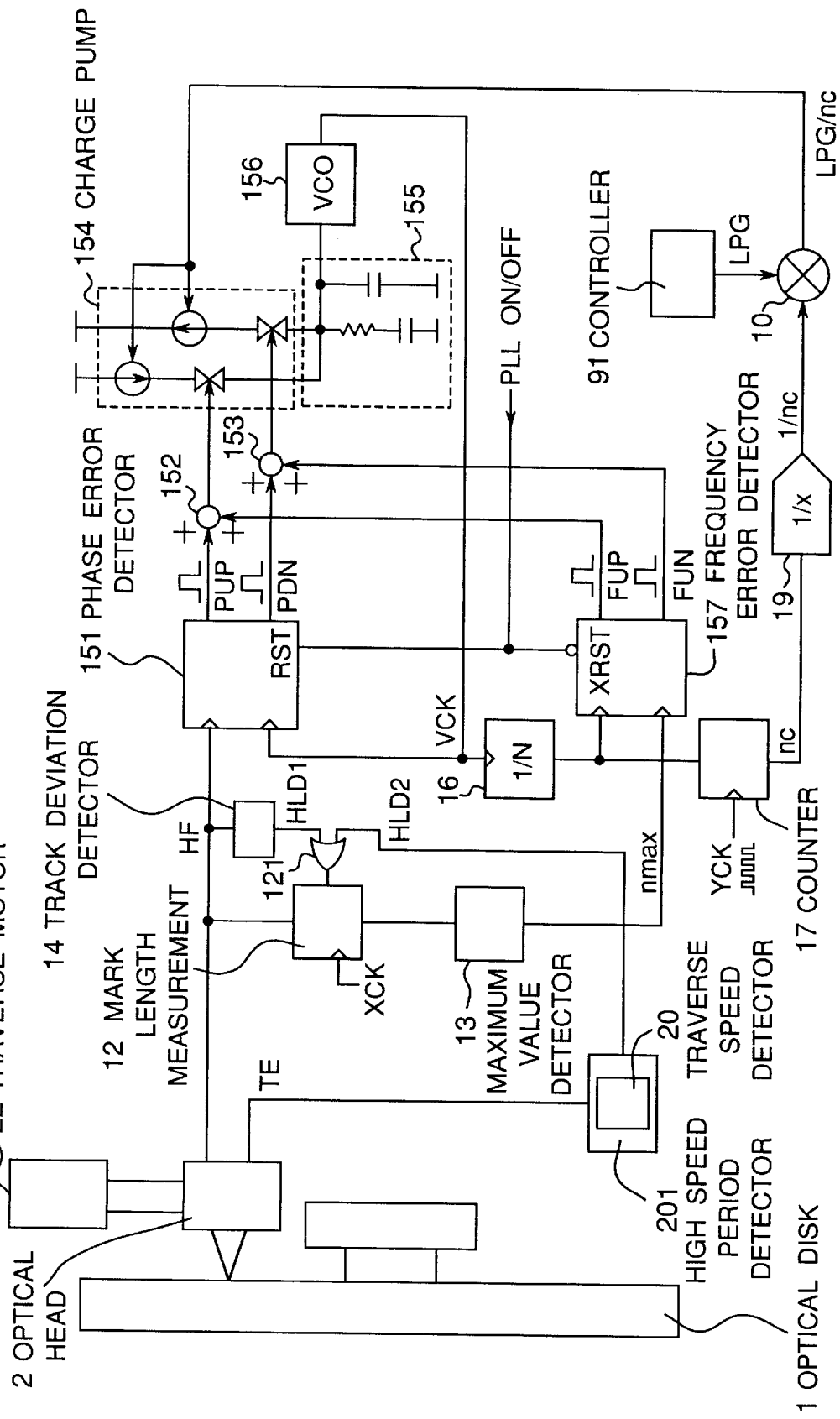
FIG. 8 is a block diagram of a fifth embodiment of an optical disk drive apparatus according to the present invention.
Figure 9:
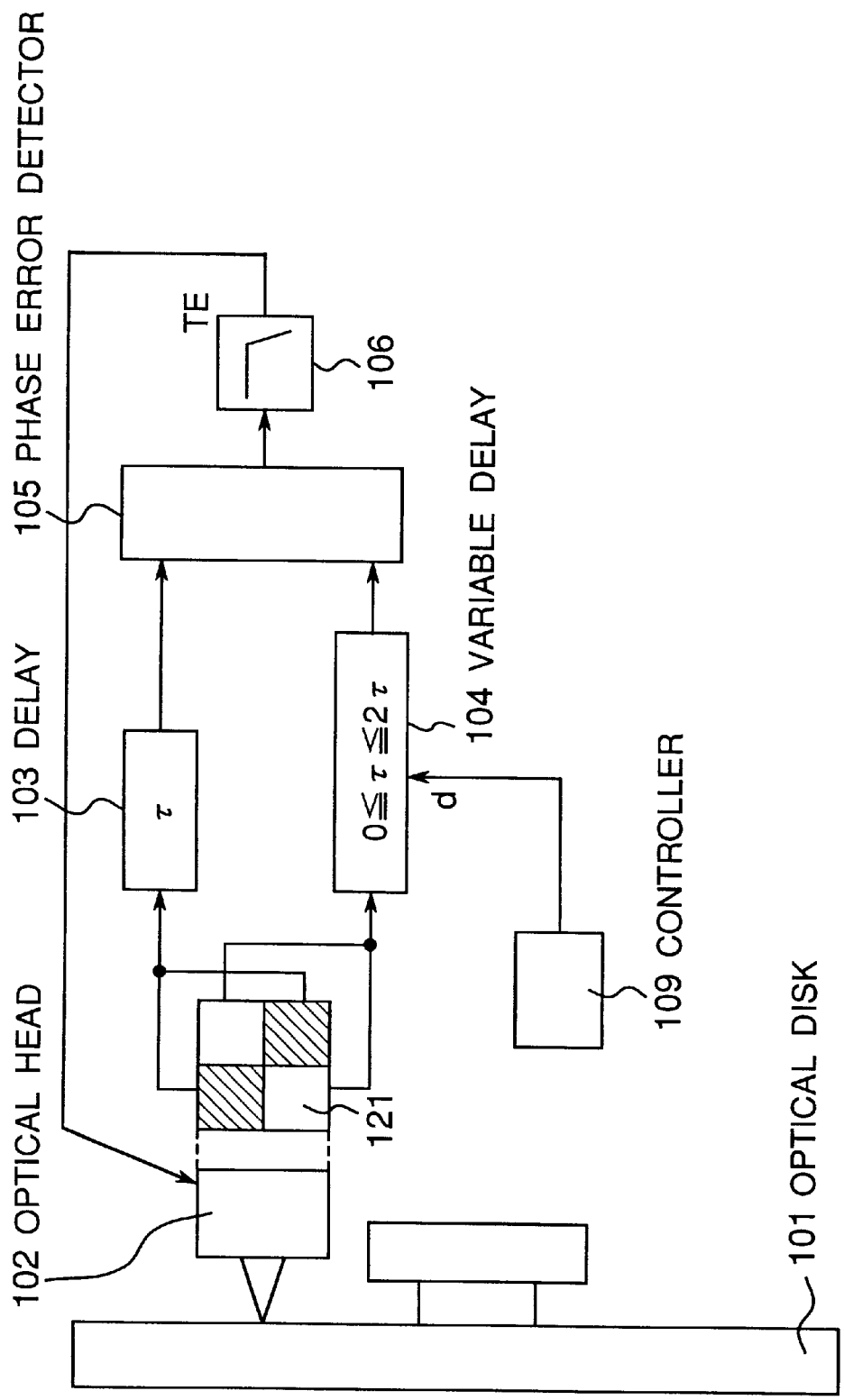
FIG. 9 is a block diagram of a prior art optical disk drive apparatus.

In FIG. 8, optical disk 1, optical head 2, multiplier 10, mark length measuring means 12, maximum value detection means 13, frequency divider 16, counter 17, reciprocal calculation means 19 and the traverse motor have the same functions as shown in FIG. 3 or FIG. 6. Furthermore, in FIG. 8, the information reproduction signal HF that is output from optical head 2 has its phase error with respect to clock signal VCK detected in phase error detector 151. If the phase error is advanced, this is supplied to charge pump 154 as pulse signal PUP. If the phase error is a lagging error, it is supplied to charge pump 154 as pulse signal PDN. Charge pump 154 sources current in respect of loop filter 155 in response to pulse signal PUP and sinks current in response to signal PDN. An integrated error voltage is therefore generated in loop filter 155 and this is supplied to VCO (voltage controlled oscillator) 156. VCO 156 generates a clock signal VCK proportional to this integrated error voltage and feeds this back to phase error detector 151. As a result, information reproduction signal HF and clock signal VCK are controlled such that their mutual phase error is a minimum.

The control gain in this process must be appropriate. If the gain is too low, the phase error remains since the jitter cannot be sufficiently tracked. On the other hand, if the gain is too high, overshooting occurs, and this itself causes phase error. The correct gain, for which the phase error is a minimum, is determined by the gain of the charge pump 154 and the time constant of loop filter 155. However, if their characteristics are fixed, this phase gain fluctuates depending on changes in linear velocity.

Accordingly, in this embodiment, it is sought to maintain optimum gain in respect of phase, irrespective of changes in linear velocity, by changing the gain of the charge pump 154 in proportion to linear velocity. Specifically, the clock signal VCK that is output from the VCO is divided in frequency by N by frequency divider 16 and its period is counted by counter 17. A value proportional to the linear velocity is thereby calculated by using reciprocal calculation means 19 to find the reciprocal of this measured value nc. This value and the loop gain constant LPG specified by the controller 91 are then multiplied by multiplier 10 to obtain LPG/nc, which is then supplied to charge pump 154. Charge path 194 is constructed of a variable current source and a current switch that is operated in response to pulse signals PUP, PDN. If the current amount of this variable current source is changed proportionally to the output of multiplier 10, the control gain (time constant) of the PLL can be changed in response to the linear velocity, and, as a result, the gain can be made fixed with respect to phase.

However, the above operation was under the assumption that the PLL is operating. If the PLL is not operating, the above means does not function, so the PLL gain control is compensated from the linear velocity calculated from the maximum mark signal contained in the information reproduction signal HF. It might be thought that it is meaningless to compensate the PLL gain whilst the PLL is not actuated, but the need for this does in fact arise immediately before PLL actuation. The maximum mark length nmax contained in the information reproduction signal HF is found by means of the mark length measurement means 12 and the maximum value detection means 13. Frequency error detector 157 compares this with the period nc of the N frequency-divided signal of clock signal VCK and, if nc>nmax, supplies a pulse signal FUP to charge pump 154 and, if n<nmax, supplies a pulse signal FDN to charge pump 154. VCO 156 raises or lowers the frequency of clock signal VCK in response thereto, and, as a result, the frequency of clock signal VCK is established such that the measured value nc=nmax. So-called frequency control is thereby performed. Since, as mentioned above, the maximum value detection means output nmax is inversely proportional to the linear velocity, as a result, even when frequency control is being executed, the frequency of clock signal VCK is practically proportional to the linear velocity. A gain that is proportional to the linear velocity can thus be set immediately prior to PLL actuation just as it is set during PLL actuation. However, for reasons associated with the measuring accuracy of mark length detection means 12, the accuracy of such gain setting is not as great as during actual PLL operation.

It should be noted that, in this embodiment also, it is necessary to prevent spurious operation during track deviation and during high-speed traversing. Accordingly, it is arranged for the operation of mark length measurement means 12 to be temporarily held by using track deviation detection means 14 and traversing speed detection means 20 having the same functions as shown in FIG. 3 and FIG. 7.

Also, although in the second embodiment or fourth embodiment, the PLL operating period and non-operating period were changed over using switch 18, in this embodiment, resetting of phase error detector 151 and frequency error detector 157 is performed in complementary fashion and the outputs of both of these are arranged to be added using addition means 152, 153.

Thus, with this embodiment as described above, irrespective of whether the PLL is actuated or not, when performing compensation using a time-based technique i.e. the PLL of jitter generated due to spatial factors i.e. non-uniformity of the recording marks on the optical disk, this can always be implemented with optimum gain without being affected by fluctuations of linear velocity.

What is claimed is:

1. An optical disk drive apparatus having: an optical head for directing a laser beam on to information pits formed in an optical disk, and for obtaining information reproduction signals from the reflected light; and phase error detection means that detects a tracking error signal from a mutual phase difference of a group of signals output from a photosensor having a plurality of photosensor elements provided on the optical head; said optical disk drive apparatus comprising:

time difference adjuster that generates mutual arbitrary time difference within said group of signals;

signal length calculator which calculates the signal length of said information reproduction signals;

maximum length detector which detects the maximum length of the information reproduction signals in unit time and for outputting a time length value related to maximum time length; and altering arrangement for altering the time difference of said time difference adjuster in accordance with said time length value.

2. The optical disk drive apparatus according to claim 1, wherein said altering arrangement comprises:

reference value supplier for supplying a reference value relating to the time difference of the time difference adjuster at a predetermined position of the optical head; and multiplier for multiplying said time length value and said reference value, and applying the multiplied value to said time difference adjuster.

3. The optical disk drive apparatus according to claim 1, wherein said signal length calculator comprises:

phase synchronization arrangement that generates a clock signal that is phase-synchronized with the information reproduction signal, so that the time difference of the time difference adjuster changes in proportion to the period of said clock signal.

4. The optical disk drive apparatus according to claim 1, further comprising:

detector for detecting track deviation of the laser beam, so that the operation of measuring the signal length of the information reproduction signal being interrupted during track deviation.

5. The optical disk drive apparatus according to claim 1, further comprising:

detector for detecting the speed of traversing of the optical head, so that the operation of measuring the signal length of the information reproduction signal is interrupted when said traversing speed exceeds a predetermined value.

* * * * *